United States Patent
Osawa et al.

(10) Patent No.: US 7,456,903 B2
(45) Date of Patent: Nov. 25, 2008

(54) VIDEO SIGNAL PROCESSING CIRCUIT

(75) Inventors: Ikuo Osawa, Kiryu (JP); Yoshifumi Yoshida, Ota (JP); Hiroyuki Ebinuma, Fukaya (JP); Toru Okada, Ota (JP)

(73) Assignee: Sanyo Electric Co., Ltd., Moriguchi-shi, Osaka (JP)

( * ) Notice: Subject to any disclaimer, the term of this patent is extended or adjusted under 35 U.S.C. 154(b) by 603 days.

(21) Appl. No.: 11/242,772

(22) Filed: Oct. 4, 2005

(65) Prior Publication Data

US 2006/0072040 A1 Apr. 6, 2006

(30) Foreign Application Priority Data

Oct. 5, 2004 (JP) ............................. 2004-292132
Oct. 5, 2004 (JP) ............................. 2004-292645

(51) Int. Cl.
*H04N 9/64* (2006.01)
*H04N 5/08* (2006.01)

(52) U.S. Cl. ....................................... 348/572; 348/525

(58) Field of Classification Search ................. 348/572, 348/573, 708, 712, 713, 525, 536, 529–531, 348/540, 547; 341/126, 155
See application file for complete search history.

(56) References Cited

U.S. PATENT DOCUMENTS 6,704,009 B2 * 3/2004 Tachibana et al. ........... 345/213

2005/0275756 A1 * 12/2005 Miura ........................ 348/572

FOREIGN PATENT DOCUMENTS

| CN | 1331548 | 1/2002 |
| JP | 9-163291 | 6/1997 |
| JP | 10-254422 | 9/1998 |
| JP | 2003-153298 | 5/2003 |
| KR | 0144962 | 4/1998 |
| KR | 0191207 | 1/1999 |

OTHER PUBLICATIONS

English Patent Abstract of JP2003153298 from esp@cenet, published May 23, 2003 (1 page).
English Patent Abstract of JP10254422 from esp@cenet, published Sep. 25, 1998 (1 page).

(Continued)

*Primary Examiner*—Sherrie Hsia
(74) *Attorney, Agent, or Firm*—Osha•Liang LLP

(57) ABSTRACT

A video signal processing circuit is supplied with an analog composite video signal formed by combining at least a luminance signal with a sync signal, and processes the analog composite video signal. The video signal processing circuit has an analog filter which removes high-frequency components from the analog composite video signal, a sync separation circuit which separates a sync signal from an output signal from the analog filter, an AD converter which performs AD conversion on the analog composite video signal, and a digital video signal processing circuit which performs predetermined video signal processing on the composite video signal digitized by the AD converter, by using the sync signal obtained by the sync separation circuit.

9 Claims, 13 Drawing Sheets

OTHER PUBLICATIONS

Korean Office Action for Korean Application No. 10-2005-93405, mailed on Nov. 13, 2006 (5 pages).
Korean Patent Abstract for Korean Publication No. 100191207, Publication date Jan. 23, 1999 (1 page).
Korean Patent Abstract for Korean Publication No. 100144962, Publication date Apr. 24, 1998 (1 page).
Chinese Office Action for Chinese Application No. 200510129169.8, mailed on Jun. 8, 2007 (8 pages).
esp@cenet patent abstract for Chinese Publication No. 1331548, Publication date Jan. 16, 2002 (1 page).
esp@cenet patent abstract for Japanese Publication No. 9163291, Publication date Jun. 20, 1997 (1 page).

* cited by examiner

| SYNC SEPARATION BY ANALOG VIDEO DECODER | SYNC SEPARATION BY DIGITAL VIDEO DECODER |
|---|---|
|  |  |
| | ︎ AD CLOCK |
| | ⇩ AD CONVERSION |
| |  |
| ⇩ ANALOG LPF | ⇩ DIGITAL LPF |
|  |  |
| ⇩ SYNC SEPARATION | ⇩ SYNC SEPARATION |
|  |  |

VIDEO SIGNAL PROCESSING CIRCUIT

CROSS-REFERENCE TO RELATED APPLICATION

The entire disclosure of Japanese Patent Applications No. 2004-292132 and 2004-292645 including the specifications, claims, drawings and abstracts are incorporated herein by reference.

BACKGROUND OF THE INVENTION

1. Field of the Invention

The present invention relates to a video signal processing circuit which performs analog-to-digital (AD) conversion of an analog composite video signal, such as a television broadcast signal, to obtain a digital composite video signal, and which performs video signal processing on the digital composite video signal.

2. Description of the Prior Art

Analog decoders using bipolar integrated circuits (BIP-IC) have been widely used as video decoders for generating an RGB signal from an analog composite video signal such as an analog television broadcast signal. With the advancement of digital technology in recent years, and with the widespread proliferation of digital displays such as liquid crystal displays (LCD) and plasma displays (PDP), there have been an increasing number of digital decoders (digital video decoders) using MOS-ICs.

Referring to FIG. 11, which is a block diagram showing the configuration of an analog video decoder 70, an externally-supplied analog composite video signal is input to the analog video decoder 70 and is supplied to an analog sync separation circuit 71 and to an analog video signal processing circuit 72. The analog sync separation circuit 71 separates a sync signal from the analog composite video signal and supplies the extracted sync signal to the analog video signal processing circuit 72. The analog video signal processing circuit 72 performs various video signal processes (including Y/C separation and color demodulation) on the analog composite video signal using the sync signal supplied from the analog sync separation circuit 71 to generate and output an analog RGB signal.

Referring to FIG. 12, which is a block diagram showing the configuration of a digital video decoder 80, an externally-supplied analog composite video signal is input to the digital video decoder 80, converted into a digital signal by an AD converter (ADC) 81, and thereafter supplied to a digital sync separation circuit 82 and to a digital video signal processing circuit 83. The digital sync separation circuit 82 separates a sync signal from the converted digital composite video signal and supplies the extracted sync signal to the digital video signal processing circuit 83. The digital video signal processing circuit 83 performs various types of video signal processing (including Y/C separation and color demodulation) on the digitized composite video signal using the sync signal supplied from the digital sync separation circuit 82 to generate and output a digital RGB signal.

Japanese Patent Laid-Open Publication No. 2003-153298 and Japanese Patent Laid-Open Publication No. Hei 10-254422 include description of analog composite video signals.

Accompanying digitization, a digital video decoder as described above has many advantages over an analog video decoder. A digital video decoder, however, is inferior to the analog video decoder in synchronization performance under a weak-electric-field condition. A difference in synchronization performance between the digital and analog video decoders will be described below.

FIG. 13A is a diagram showing the waveform of an analog composite video signal free from noise. The video signal shown in FIG. 13A is a black-and-white television signal composed of a luminance signal and a sync signal. A color television signal is formed by superimposing a color burst signal on a back porch and superimposing a carrier chrominance signal on the luminance signal of a black-and-white television signal.

Separation of the sync signal (sync separation) is performed by a comparator cutting off (slicing) the composite video signal at a slice level between a tip level of the sync signal (sync tip level) and a pedestal level, such as indicated by the dot-dash line in FIG. 13A. By this sync separation, the sync signal is separated, as shown in FIG. 13B. However, high-frequency noise exists on the composite video signal under a weak-electric-field condition, as shown in FIG. 13C. This noise affects sync separation.

FIG. 14 is a diagram showing sync separation procedures. An example of a procedure in the analog video decoder is shown at the left of FIG. 14, while an example of a procedure in the digital video decoder is shown at the right of FIG. 14. Comparison between the analog video decoder and the digital video decoder will be made with reference to FIG. 14 with respect to sync separation under a weak-electric-field condition.

The analog video decoder removes high-frequency components from the analog composite video signal by using an analog low-pass filter and cuts off the obtained signal at a slice level by means of a comparator to separate the sync signal, as shown in the left section of FIG. 14. Thus, the analog video decoder is capable of suitably separating the sync signal even under weak-electric-field conditions.

On the other hand, the digital video decoder converts the analog composite video signal into a digital composite video signal by sampling the analog composite video signal based on a sampling clock, as shown at the right of FIG. 14. The composite video signal after this analog-to-digital conversion contains a digitized noise component due to noise superimposed on the weak-electric-field signal. This noise component can be reduced to a certain level by a digital low-pass filter but finally remains in the signal after sync separation, i.e., the reproduced sync signal.

As described above, the digital video decoder is inferior to the analog video decoder in terms of sync separation under a weak-electric-field condition at the present time.

The sync signal is information on timing of the composite video signal. Therefore, a problem that the video frame shakes and a problem that the luminance signal or color signal is not correctly reproduced arise if the sync signal is not accurately reproduced.

SUMMARY OF THE INVENTION

The present invention provides a video signal processing circuit which is supplied with an analog composite video signal formed by combining at least a luminance signal with a sync signal, and which processes the analog composite video signal, the video signal processing circuit including an analog filter which removes high-frequency components from the analog composite video signal, a sync separation circuit which separates a sync signal from an output signal from the analog filter, an AD converter which performs AD conversion on the analog composite video signal, and a digital video signal processing circuit which performs predetermined video signal processing on the composite video signal digitized by the AD converter using the sync signal obtained by the sync separation circuit.

The present invention also provides a video signal processing circuit which is supplied with an analog composite video signal formed by combining at least a luminance signal with a sync signal, and which processes the analog composite video signal, the video signal processing circuit including an AD converter which performs AD conversion on the analog composite video signal, a digital sync separation circuit which separates a sync signal from the composite video signal digitized by the AD converter, an input terminal to which a sync signal is externally supplied, a selector which selects one of the sync signal obtained by the digital sync separation circuit and the sync signal supplied to the input terminal, and a digital video signal processing circuit which performs predetermined video signal processing on the composite video signal digitized by the AD converter using the sync signal selected by the selector.

BRIEF DESCRIPTION OF THE DRAWINGS

Preferred embodiments of the present invention will be described in further detail based on the following drawings, wherein.

DESCRIPTION OF THE PREFERRED EMBODIMENTS

First Embodiment

Figure 1:
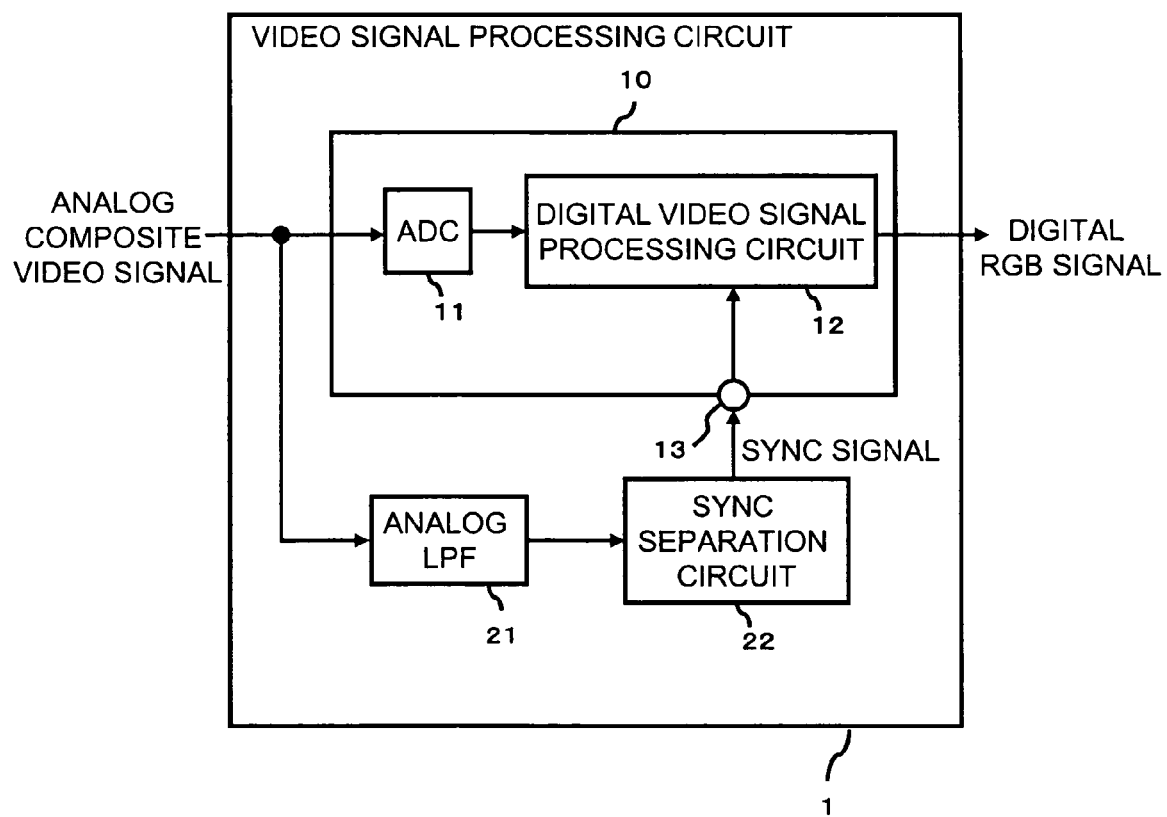
FIG. 1 is a block diagram showing the configuration of a video signal processing circuit according to a first embodiment of the present invention.

FIG. 1 is a block diagram showing the configuration of a video signal processing circuit 1 according to a first embodiment of the present invention. The video signal processing circuit 1 is a circuit (video decoder) which forms a digital three-primary-color (RGB) signal from an analog composite video signal externally supplied and outputs the digital three-primary-color signal. The analog composite video signal is an analog signal formed by combining a video signal including a luminance signal and a color signal and a sync signal. For example, the analog composite video signal is a video signal in accordance with the National Television Standards Committee (NTSC) system or the phase-alternating line (PAL) system.

Referring to FIG. 1, the video signal processing circuit 1 has an AD converter (ADC) 11, a digital video signal processing circuit 12, a low-pass filter (LPF) 21 and a sync separation circuit 22. In a preferable form of this embodiment, the LPF 21 and the sync separation circuit 22 are externally connected to a digital IC 10 including the ADC 11 and the digital video signal processing circuit 12. In this arrangement, the analog composite video signal externally supplied-is input to the ADC 11 and to the LPF 21.

The LPF 21 is an analog low-pass filter for removing high-frequency components from the input analog composite video signal. The LPF 21 removes high-frequency noise components contained in the analog composite video signal (a weak-electric-field signal in particular). The LPF 21 supplies the obtained signal to the sync separation circuit 22.

Figure 2:
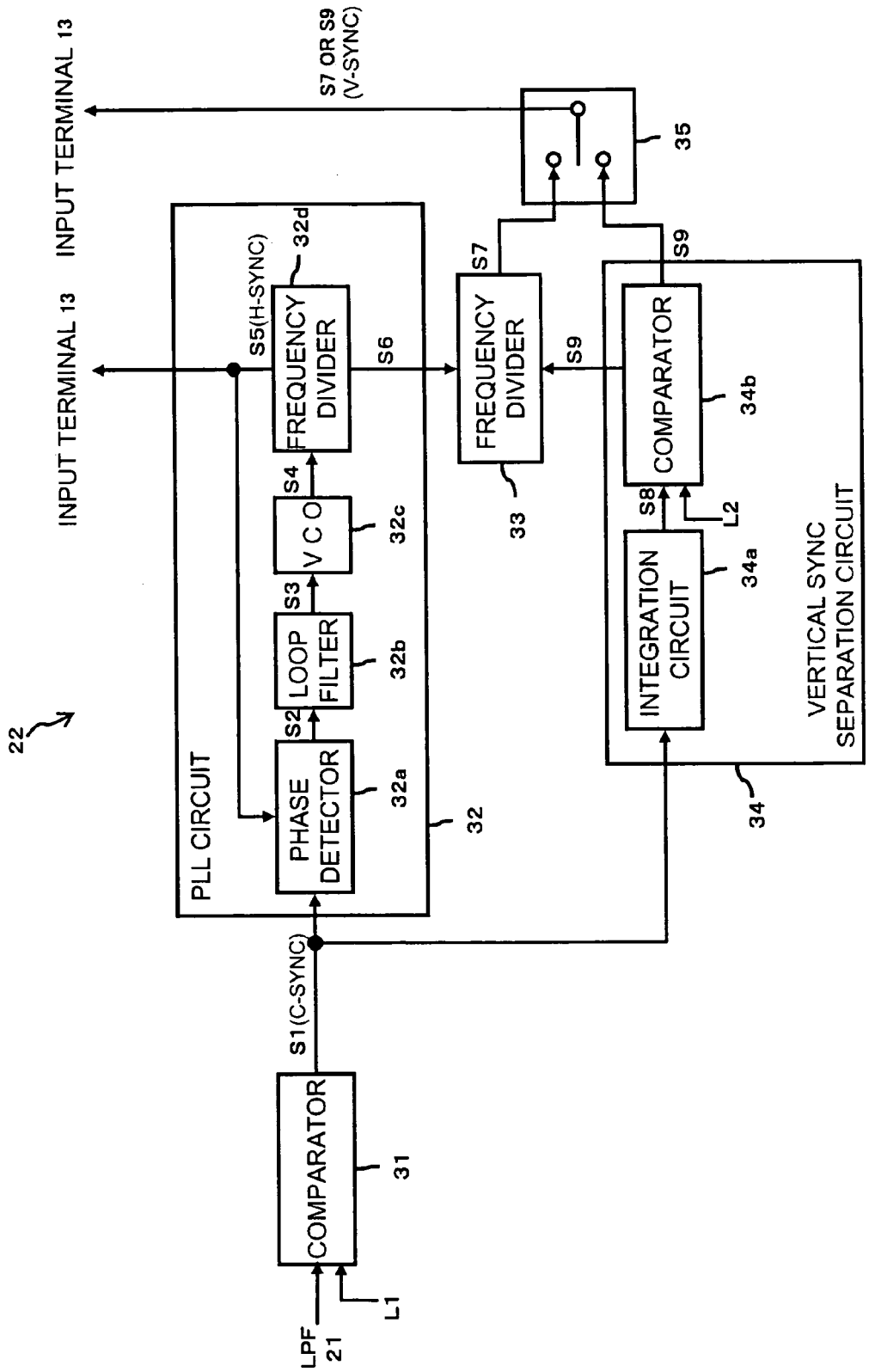
FIG. 2 is a diagram showing an example configuration of a sync separation circuit.

The sync separation circuit 22 separates the sync signal from the analog signal supplied from the LPF 21 and supplies the obtained sync signal to the digital video signal processing circuit 12 via an input terminal 13 of the digital IC 10. The sync signal comprises a horizontal sync signal (H-SYNC) and a vertical sync signal (V-SYNC), or a composite sync signal (C-SYNC) formed by combining these horizontal and vertical sync signals. FIG. 2 shows an example of the configuration of the sync separation circuit 22. However, various types of sync separation circuits are known, and the sync separation circuit 22 according to this embodiment is not limited to any particular type. The sync separation circuit 22 shown in FIG. 2 will be described below. In the following, an example in which the analog composite video signal is an NTSC signal will be described.

Referring to FIG. 2, the sync separation circuit 22 includes a comparator 31, a phase-locked loop (PLL) circuit 32, a frequency divider 33, a vertical sync separation circuit 34, and a switch circuit 35.

The comparator 31 is supplied with the analog composite video signal from the LPF 21 after removal of noise, and separates a signal S1 (C-SYNC) from the analog composite video signal by cutting off (slicing) the analog composite video signal at a predetermined slice level L1. The comparator 31 supplies the obtained signal S1 to the PLL circuit 32. The PLL circuit 32 includes a phase detector 32a, a loop filter 32b, a voltage controlled oscillator (VCO) 32c and a frequency divider 32d.

The phase detector 32a is supplied with the output signal S1 from the comparator 31 and an output signal S5 (reproduced H-SYNC) from the frequency divider 32d, compares the phases of these signals and outputs to the loop filter 32b a phase difference signal S2 having a voltage value corresponding to the phase difference between these signals.

The loop filter 32b removes high-frequency components from the phase difference signal S2 supplied from the phase detector 32a to obtain a signal S3, and supplies the signal S3 to the VCO 32c.

The VCO 32c adjusts the oscillation frequency of an output signal S4 according to the voltage value of the signal S3 supplied from the loop filter 32b, and outputs the signal S4 to the frequency divider 32d. The VCO 32c adjusts the oscillation frequency in such a direction as to eliminate the phase difference between the output signal S1 from the comparator 31 and the output signal S5 from the frequency divider 32d.

The frequency divider 32d includes a down counter. The frequency divider 32d divides the frequency of the output signal S4 from the VCO 32c at a dividing ratio N (N: an even number) to generate a signal S5 having a period of 1H (one horizontal scanning period). The frequency divider 32d outputs the signal S5 as a reproduced H-SYNC to the input terminal 13 of the digital IC 10, and feeds backs the signal S5 to the phase detector 32a. In the process of generating the signal S5, the frequency divider 32d also divides the frequency of the output signal S4 from the VCO 32c at a dividing ratio of N/2 to generate a signal S6 having a period of H/2, and outputs the signal S6 to the frequency divider 33.

The frequency divider 33 includes a down counter. The frequency divider 33 divides the frequency of the output signal S6 supplied from the frequency divider 32d and having a period H/2 by 525 to generate a signal S7 having a period of 262.5H. The frequency divider 33 outputs the signal S7 to the switch circuit 35.

The output signal S1 from the comparator 31 is supplied to the PLL circuit 32 and to the vertical sync separation circuit 34.

Figure 3:
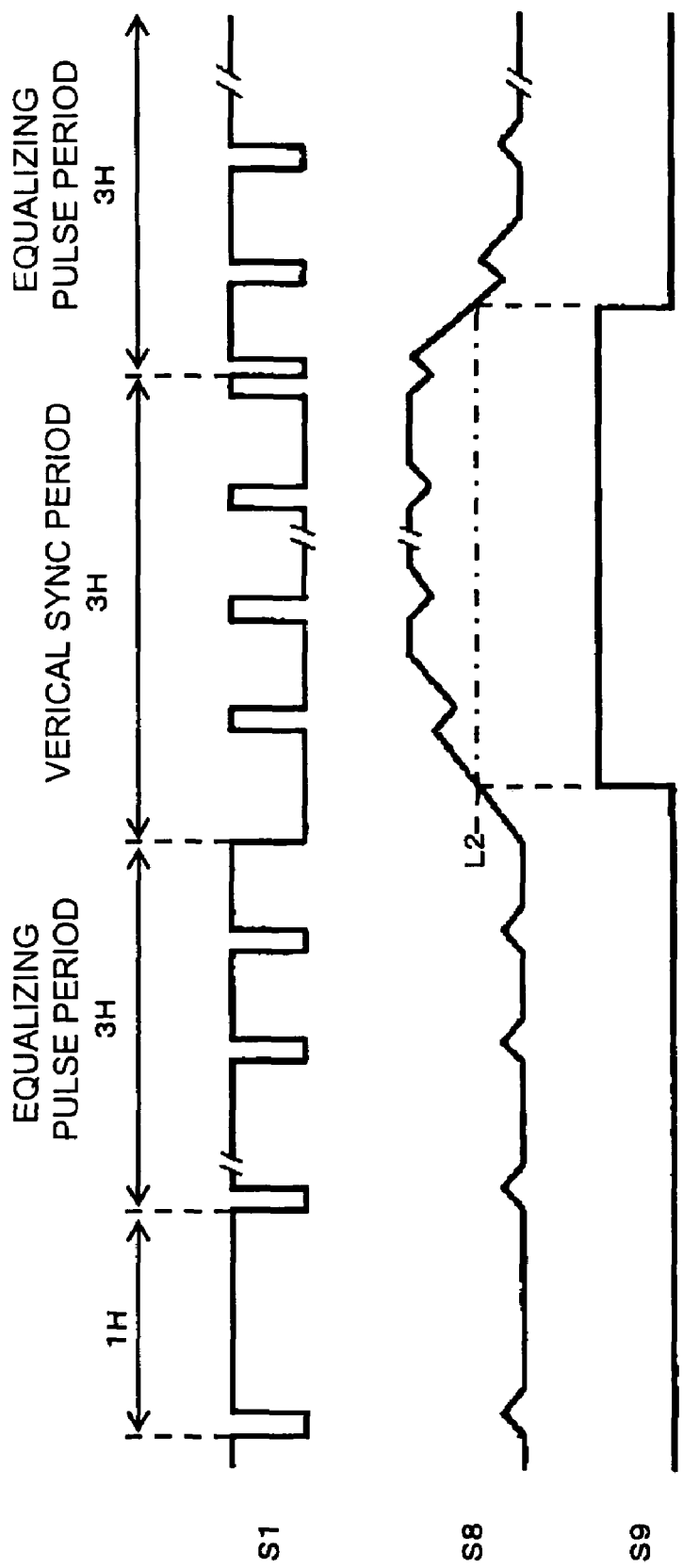
FIG. 3 is a diagram showing the waveforms of example signals in a vertical sync separation circuit.

The vertical sync separation circuit 34 includes an integration circuit 34a and a comparator 34b. FIG. 3 shows a diagram of the waveforms of the input signal S1 input to the vertical sync separation circuit 34, an output signal S8 from the integration circuit 34a and an output signal S9 from the comparator 34b.

The integration circuit 34a integrates the input signal S1 by an analog method or a digital method to obtain the integral signal S8, and outputs the integral signal S8 to the comparator 34b. The comparator 34b cuts off the integral signal S8 from the integration circuit 34a at a predetermined slice level L2 to obtain the signal S9, and outputs the signal S9 to the switch circuit 35. The comparator 34b also supplies the signal S9 to the frequency divider 33. The frequency divider 33 is reset by suitable timing based on the signal S9. For example, the frequency divider 33 is reset by the first pulse contained in the signal S9 with respect to a certain sequence in the analog composite video signal.

The switch circuit 35 selectively outputs either the output signal S7 from the frequency divider 33 or the output signal S9 from the vertical sync separation circuit 34 as a reproduced V-SYNC to the input terminal 13 of the digital IC 10. For example, the switch circuit 35 selects the signal S9 with respect to a certain sequence in the analog composite video signal until the first pulse of the signal S9 is output, and selects the signal S7 after output of this pulse.

The C-SYNC, H-SYNC or V-SYNC reproduced by the above-described sync separation circuit 22 are also output externally from the video signal processing circuit 1.

Referring again to FIG. 1, the ADC 11 performs AD conversion on the input analog composite video signal to obtain a digital composite video signal and outputs the obtained digital composite video signal to the digital video signal processing circuit 12.

The digital video signal processing circuit 12 performs predetermined video signal processings on the composite video signal digitized by the ADC 11 by using the sync signal (H-SYNC and V-SYNC) supplied to the input terminal 13, i.e., the sync signal reproduced by the sync separation circuit 22, to generate and output a digital RGB signal. The predetermined video signal processings include, for example, processing for generating a clamp pulse for a clamp circuit (not shown) for clamping the analog composite video signal, Y/C separation processing for generating a luminance signal (Y) and a color signal (C) from the digitized composite video signal, color demodulation processing for demodulating the generated color signal to obtain color difference signals (R-Y, G-Y, and B-Y), and RGB signal generation processing for generating the RGB signal from the luminance signal and the color difference signals.

An example operation of the video signal processing circuit 1 having the above-described configuration will be briefly described. The externally-supplied analog composite video signal is input to the ADC 11 and to the LPF 21. The LPF 21 removes noise components from the analog composite video signal and outputs the obtained signal to the sync separation circuit 22. The sync separation circuit 22 extracts the sync signal (H-SYNC and V-SYNC) from the analog composite video signal after removal of noise and supplies the sync signal to the digital video signal processing circuit 12. On the other hand, the ADC 11 performs AD conversion on the analog composite video signal to obtain a digital composite video signal and outputs the obtained digital composite video signal to the digital video signal processing circuit 12. The digital video signal processing circuit 12 generates a digital RGB signal from the digital composite video signal by using the sync signal accurately reproduced by the sync separation circuit 22 to output the digital RGB signal.

The above-described embodiment realizes various advantages. For example, because, in the video signal processing circuit for performing video signal processing on a digitized composite video signal obtained by making AD conversion of an input analog composite video signal, sync separation is performed not on the composite video signal after AD conversion but on a signal obtained by removing high-frequency components from the analog composite video signal by means of an analog filter, sync performance under a weak-electric-field condition is improved over that of a conventional digital video decoder 80, thereby making it possible to obtain an accurate sync signal under a weak-electric-field condition. As a result, shaking of the video frame due to synchronization error can be reduced. Also, use of the accurate sync signal ensures that the luminance signal and the color signal are reproduced in a good condition.

Also, in the video signal processing circuit (digital video decoder) having an AD converter for making AD conversion of an input analog composite video signal and a digital video signal processing circuit which performs video signal processing on the composite video signal digitized by the AD converter, sync separation is not performed as internal processing on the composite video signal after AD conversion. Instead, sync separation is performed on a signal obtained by removing high-frequency components from the analog composite video signal by means of an analog filter in an external circuit. A sync signal is supplied from the external circuit. According to this embodiment, therefore, the sync performance under a weak-electric-field condition can be improved in comparison with the conventional digital video decoder 80, thereby making it possible to obtain an accurate sync signal under the weak-electric-field condition. As a result, shaking of the video frame due to synchronization error can be reduced. Also, use of the accurate sync signal ensures that the luminance signal and the color signal are reproduced in a good condition.

Second Embodiment

Figure 4:
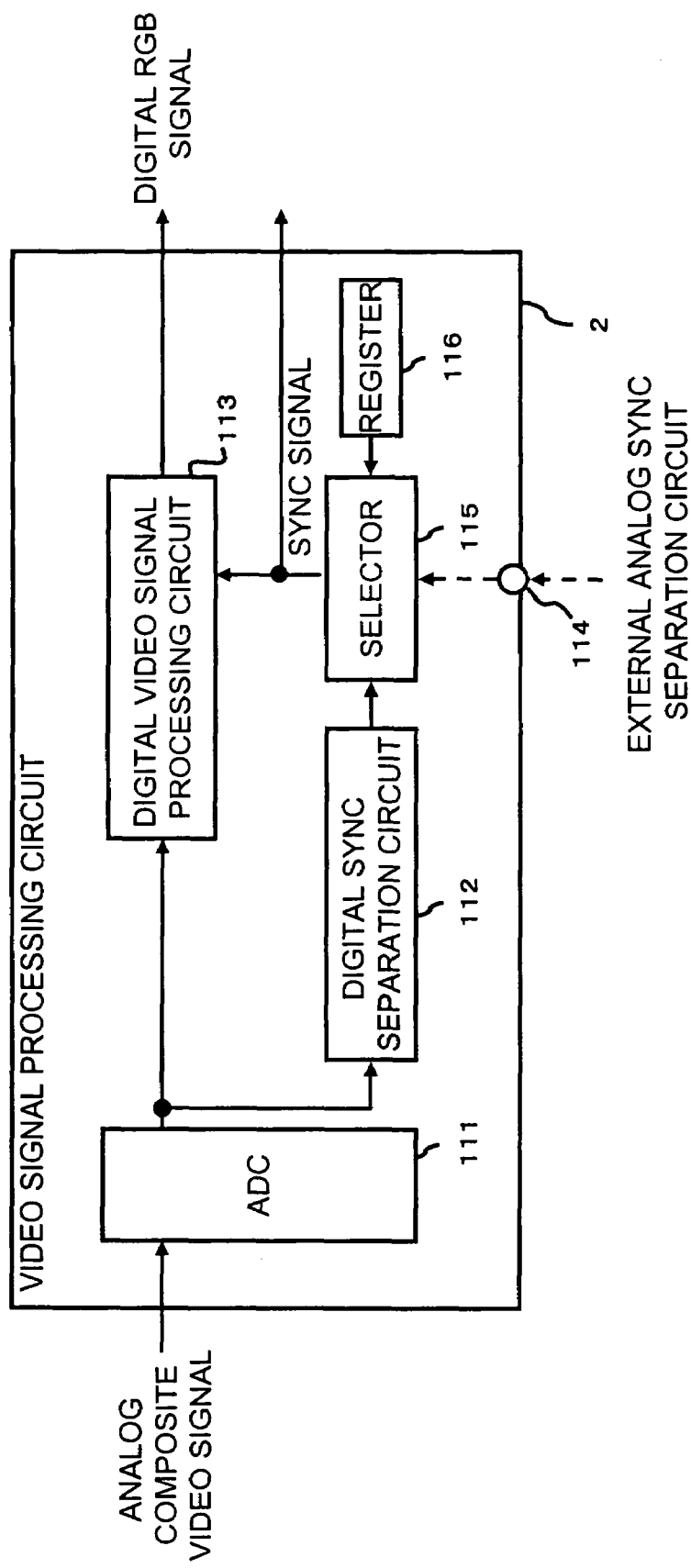
FIG. 4 is a block diagram showing the configuration of a video signal processing circuit according to a second embodiment of the present invention.

FIG. 4 is a block diagram showing the configuration of a video signal processing circuit 2 according to a second embodiment of the present invention. The video signal processing circuit 2 is a circuit which forms a digital three-primary-color (RGB) signal from an externally-supplied analog composite video signal and outputs the digital three-primary-color signal.

Referring to FIG. 4, the video signal processing circuit 2 has an AD converter (ADC) 111, a digital sync separation circuit 112, a digital video signal processing circuit 113, an input terminal 114, and a selector 115. In a preferable form of this embodiment, the video signal processing circuit 2 is a digital video decoder constituted by a digital IC. In this arrangement, the analog composite video signal externally supplied is input to the ADC 111.

The ADC 111 performs AD conversion on the input analog composite video signal to obtain a digital composite video signal, and then supplies the digital composite video signal to the digital sync separation circuit 112 and to the digital video signal processing circuit 113.

Figure 5:
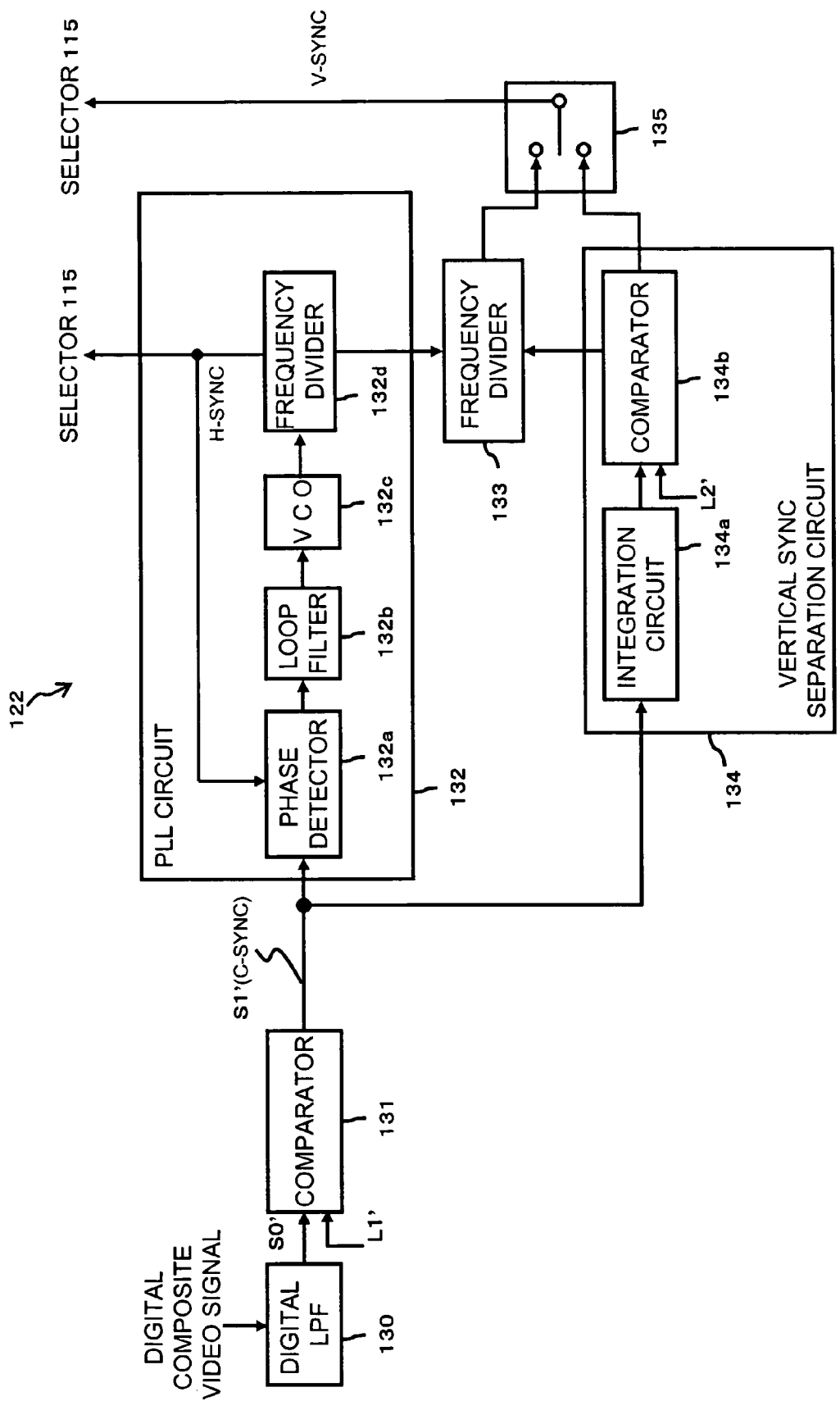
FIG. 5 is a diagram showing an example configuration of a digital sync separation circuit.

The digital sync separation circuit 112 separates a sync signal from the digital composite video signal supplied from the ADC 111 and supplies the obtained sync signal to the digital video signal processing circuit 113 via the selector 115 described below. The sync signal comprises a horizontal sync signal (H-SYNC) and a vertical sync signal (V-SYNC). FIG. 5 shows an example of the configuration of the digital sync separation circuit 112. However, various types of digital sync separation circuits are known and the digital sync separation circuit 112 according to this embodiment is not limited to any particular type. The digital sync separation circuit 112 shown in FIG. 5 will be described below. In the following description, the analog composite video signal is assumed to be a video signal in accordance with the NTSC system.

Referring to FIG. 5, the digital sync separation circuit 112 includes a digital low-pass filter (digital LPF) 130, a comparator 131, a PLL circuit 132, a frequency divider 133, a vertical sync separation circuit 134 and a switch circuit 135.

The digital LPF 130 is supplied with the digital composite video signal from the ADC 111 and removes high-frequency components from this signal, thereby obtaining a signal S0'. The digital LPF 130 supplies the signal S0' to the comparator 131.

The comparator 131 separates a signal S1' (C-SYNC) from the composite video signal S0' supplied from the digital LPF 130 by cutting off (slicing) the composite video signal S0' at a predetermined slice level L1'. The comparator 131 supplies the obtained signal S1' to the PLL circuit 132 and to the vertical sync separation circuit 134.

The PLL circuit 132, the frequency divider 133, the vertical sync separation circuit 134 and the switch circuit 135 correspond to the similarly-numbered components 32 to 35 in the sync separation circuit 22 shown in FIG. 2. Description of these components will not be repeated. In this embodiment, however, an output signal (reproduced H-SYNC) from a frequency divider 132d included in the PLL circuit 132 and an output signal (reproduced V-SYNC) from the switch circuit 135 are output to the selector 115.

Referring again to FIG. 4, the digital video signal processing circuit 113 performs predetermined video signal processings on the composite video signal digitized by the ADC 111 by using the sync signal (H-SYNC and V-SYNC) supplied from the selector 115 to generate a digital RGB signal. The digital video signal processing circuit 113 outputs the digital RGB signal externally from the video signal processing circuit 2. The predetermined video signal processings are, for example, those of the first embodiment, i.e., processing for generating a clamp pulse, Y/C separation processing, color demodulation processing, and RGB signal generation processing.

As described above, the video signal processing circuit 2 of this embodiment can extract a sync signal by means of the internal digital sync separation circuit 112 and generate a digital RGB signal from an analog composite video signal by using the sync signal. That is, the above-described video signal processing circuit 2 functions as a digital video decoder by operating independently.

However, the arrangement in which sync separation is performed by the digital sync separation circuit 112 is incapable of obtaining an accurate sync signal under a weak-electric-field condition, as described above. Therefore there is a problem that the video frame shakes or a problem that the luminance signal and the color signal are not accurately reproduced, under a weak-electric-field condition. Also, the performance of the analog sync separation circuit is higher than that of the digital sync separation circuit in the case of sync separation under a weak-electric-field condition, as described above.

In the present embodiment, to make possible improvement of the sync performance under a weak-electric-field condition, the video signal processing circuit 2 is configured so as to enable use of a sync signal obtained by an external analog sync separation circuit. More specifically, the video signal processing circuit 2 is provided with the input terminal 114 to which the sync signal is supplied from the external analog sync separation circuit, and the selector 115 which selects one of the sync signal obtained by the digital sync separation circuit 112 and the sync signal supplied to the input terminal 114. More concrete description will be made of the corresponding configuration.

Figure 6:
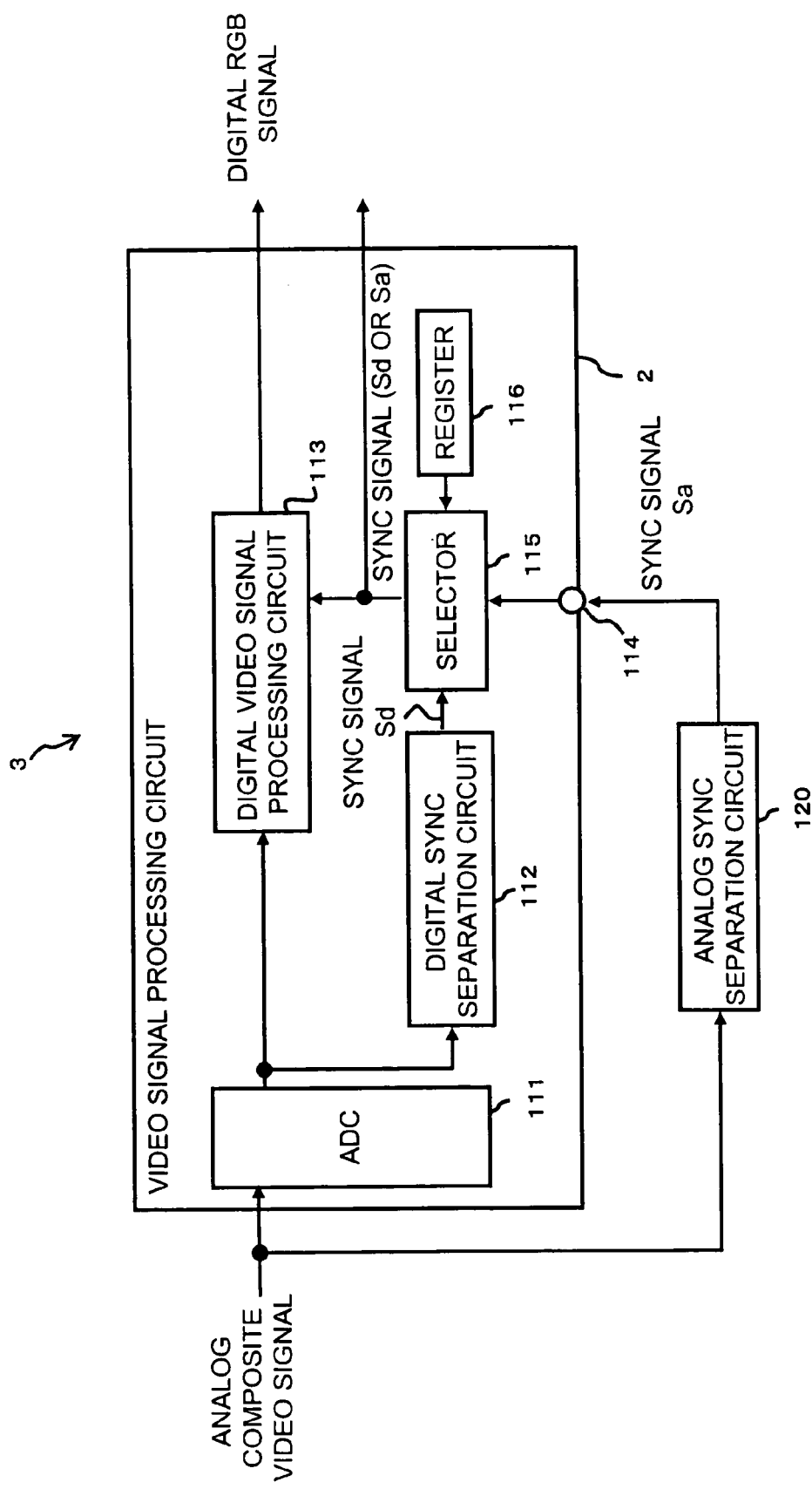
FIG. 6 is a block diagram showing the configuration of a video signal processing circuit including the video signal processing circuit shown in FIG. 4 and an analog sync separation circuit externally connected to the video signal processing circuit shown in FIG. 4.

FIG. 6 is a block diagram showing the configuration of a video signal processing circuit 3 including the video signal processing circuit 2 and an analog sync separation circuit 120 externally connected to the video signal processing circuit 2. Referring to FIG. 6, the analog composite video signal externally supplied is input to the analog sync separation circuit 120 as well as to the ADC 111.

The analog sync separation circuit 120 removes high-frequency components from the analog composite video signal by means of an analog filter, separates the sync signal from the composite video signal after removable of high-frequency components, and outputs the sync signal to the input terminal 114 of the video signal processing circuit 2. The sync signal comprises a horizontal sync signal (H-SYNC) and a vertical sync signal (V-SYNC), or a composite sync signal (C-SYNC) formed by combining these horizontal and vertical sync signals.

Figure 7:
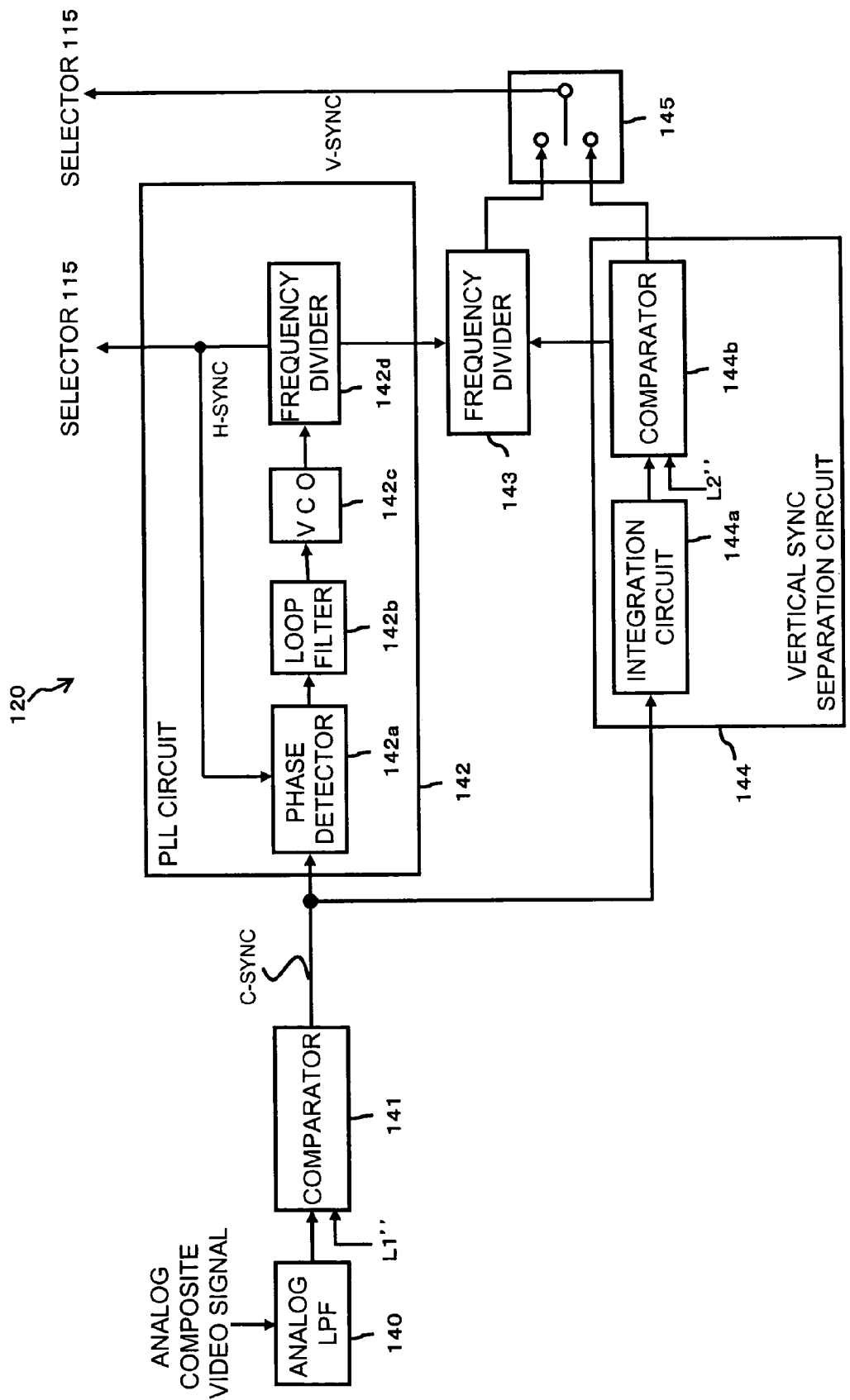
FIG. 7 is a diagram showing an example configuration of an analog sync separation circuit.

FIG. 7 shows an example configuration of an analog sync separation circuit 120. However, various types of analog sync separation circuits are known and the analog sync separation circuit 120 according to this embodiment is not limited to any particular type. The analog sync separation circuit 120 shown in FIG. 7 will be described below. In the following description, the analog composite video signal is an NTSC video signal.

Referring to FIG. 7, the analog sync separation circuit 120 includes an analog low-pass filter (analog LPF) 140, a comparator 141, a PLL circuit 142, a frequency divider 143, a vertical sync separation circuit 144 and a switch circuit 145.

The analog LPF 140 removes high-frequency components from the input analog composite video signal. High-frequency noise components contained in the analog composite video signal (a weak-electric-field signal in particular) is removed by the analog LPF 140. The analog LPF 140 supplies the signal obtained by removing high-frequency components to the comparator 141.

The comparator 141, the PLL circuit 142, the frequency divider 143, the vertical sync separation circuit 144, and the switch circuit 145 correspond to the similarly-numbered components 31 to 35 in the sync separation circuit 22 shown in FIG. 2 and their description will not be repeated. In this embodiment, however, an output signal (reproduced H-SYNC) from a frequency divider 142d included in the PLL circuit 142 and an output signal (reproduced V-SYNC) from the switch circuit 145 are output to the selector 115 via the input terminal 114.

Referring again to FIG. 6, the sync signal separated by the analog sync separation circuit 120 is supplied to the selector 115 via the input terminal 114 of the video signal processing circuit 2. Thus, the sync signal separated by the digital sync separation circuit 112 (hereinafter referred to as "sync signal Sd") and the sync signal separated by the analog sync separation circuit 120 (hereinafter referred to as "sync signal Sa") are supplied to the selector 115.

The selector 115 selects one of either the sync signal Sd or the sync signal Sa. For example, the selector 115 selects the sync signal Sd when the value of a register 116 which can be set from the outside is "0", and selects the sync signal Sa when the value of the register 116 is "1". The selector 115 outputs the selected sync signal Sd or Sa externally from the video signal processing circuit 3 and also supplies the sync signal to the digital video signal processing circuit 113.

The digital video signal processing circuit 113 performs predetermined video signal processings on the digital composite video signal by using the sync signal Sd or Sa supplied from the selector 115 to generate and output a digital RGB signal.

A preferable mode of use of the video signal processing circuit 2 having the above-described configuration will be described.

When cost is a great concern than performance, a user (e.g., a television receiver manufacturer) may install the video signal processing circuit 2 shown in FIG. 4 as a video decoder in a television receiver without externally connecting the analog sync separation circuit 120. In such a case, if the value of the register 116 is set to "0", the sync signal Sd extracted by the digital sync separation circuit 112 is supplied to the digital video signal processing circuit 113. In this mode of use, therefore, an accurate sync signal can be obtained with respect to a video signal having a comparatively small amount of noise, but an accurate sync signal cannot be obtained with respect to a video signal having a comparatively large amount of noise (a weak-electric-field signal or the like).

On the other hand, when sync performance is a greater concern than manufacturing cost, the user externally connects the analog sync separation circuit 120 to the video signal processing circuit 2 and installs the video signal processing circuit 3 shown in FIG. 6 as a video decoder in a television receiver. In this case, if the value of the register 116 is set to "1", the sync signal Sa extracted by the analog sync separation circuit 120 is supplied to the digital video signal processing circuit 113. In this mode of use, therefore, an accurate sync signal can be obtained even with respect to a video signal having a comparatively large amount of noise (a weak-electric-field signal or the like). That is, the user can improve the sync performance of the digital video decoder by externally connecting the analog sync separation circuit 120.

The digital video signal processing circuit 113 is designed by assuming the case of supply of the sync signal Sd, i.e., with reference to timing using the sync signal Sd. Accordingly, the user checks deviation of the sync signal Sa from the sync signal Sd with respect to time in the case of externally connecting the analog sync separation circuit 120. More specifically, the user selects the output of the selector 115 and compares the waveforms of the signal at a suitable point (e.g., the output signal from the selector 115) between the case where the sync signal Sd is selected and the case where the sync signal Sa is selected, thereby checking deviation of the sync signal Sa from the sync signal Sd with respect to time. The user adjusts the analog sync separation circuit 120 so that the deviation with respect to time is eliminated. Alternatively, the user adjusts various timing signals generated by the digital video signal processing circuit 113 so that the influence of the deviation with respect to time is eliminated. Therefore, it is preferable that the timing signals generated by the digital video signal processing circuit 113 be adjustable with respect to time.

Figure 8:
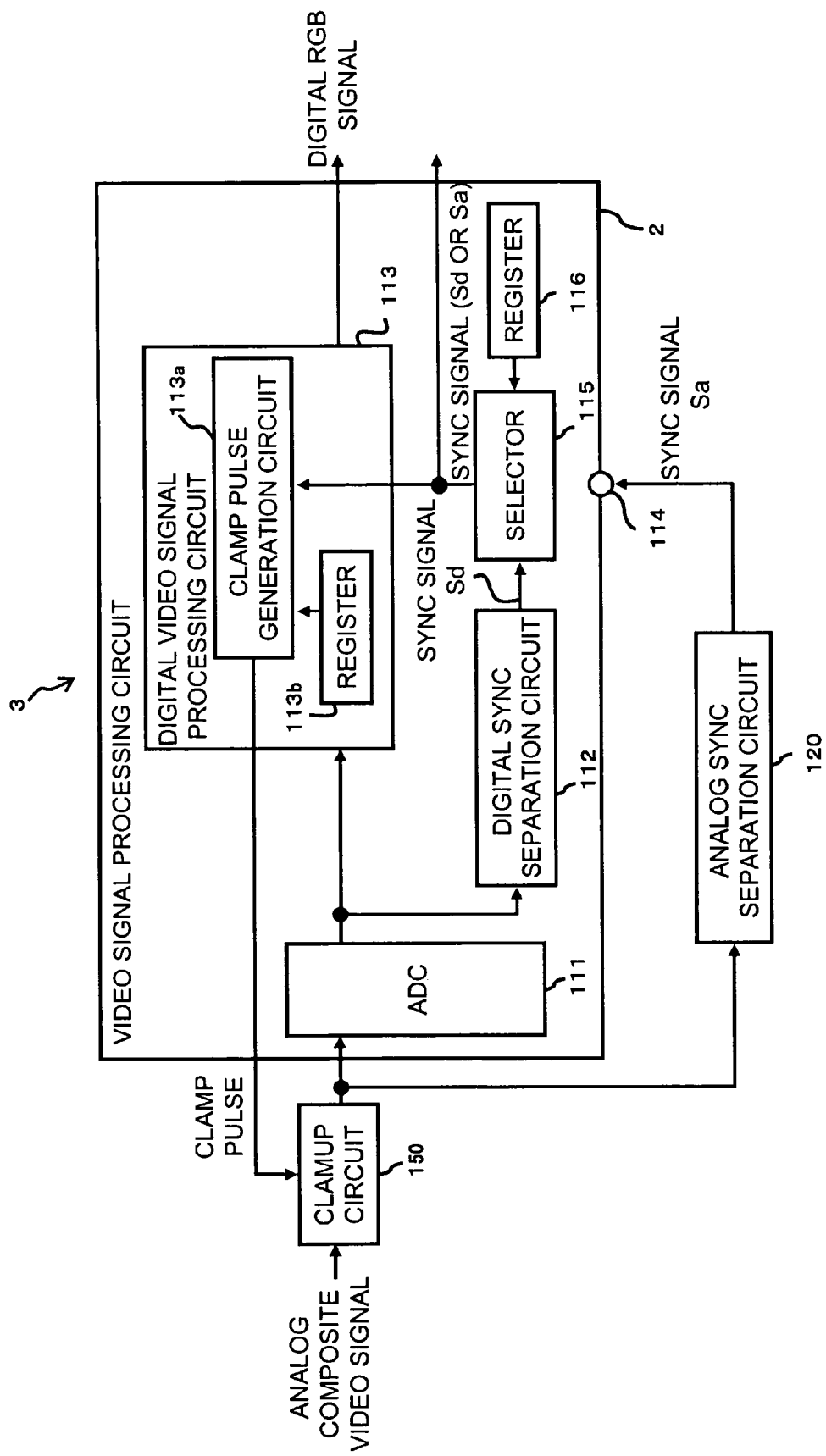
FIG. 8 is a block diagram for explaining adjustment of timing of a clamp pulse.

Adjustment of clamp pulse timing will be described as an example of timing signal adjustment described above. FIG. 8 is a block diagram for explaining clamp pulse timing adjustment.

Referring to FIG. 8, a clamp pulse generation circuit 113a included in the digital video signal processing circuit 113 generates a clamp pulse on the basis of the sync signal Sd or Sa supplied from the selector 115, and outputs the clamp pulse to a clamp circuit 150. The clamp circuit 150 clamps the analog composite video signal at a predetermined level during the time period during which the clamp pulse is supplied.

Figure 9:
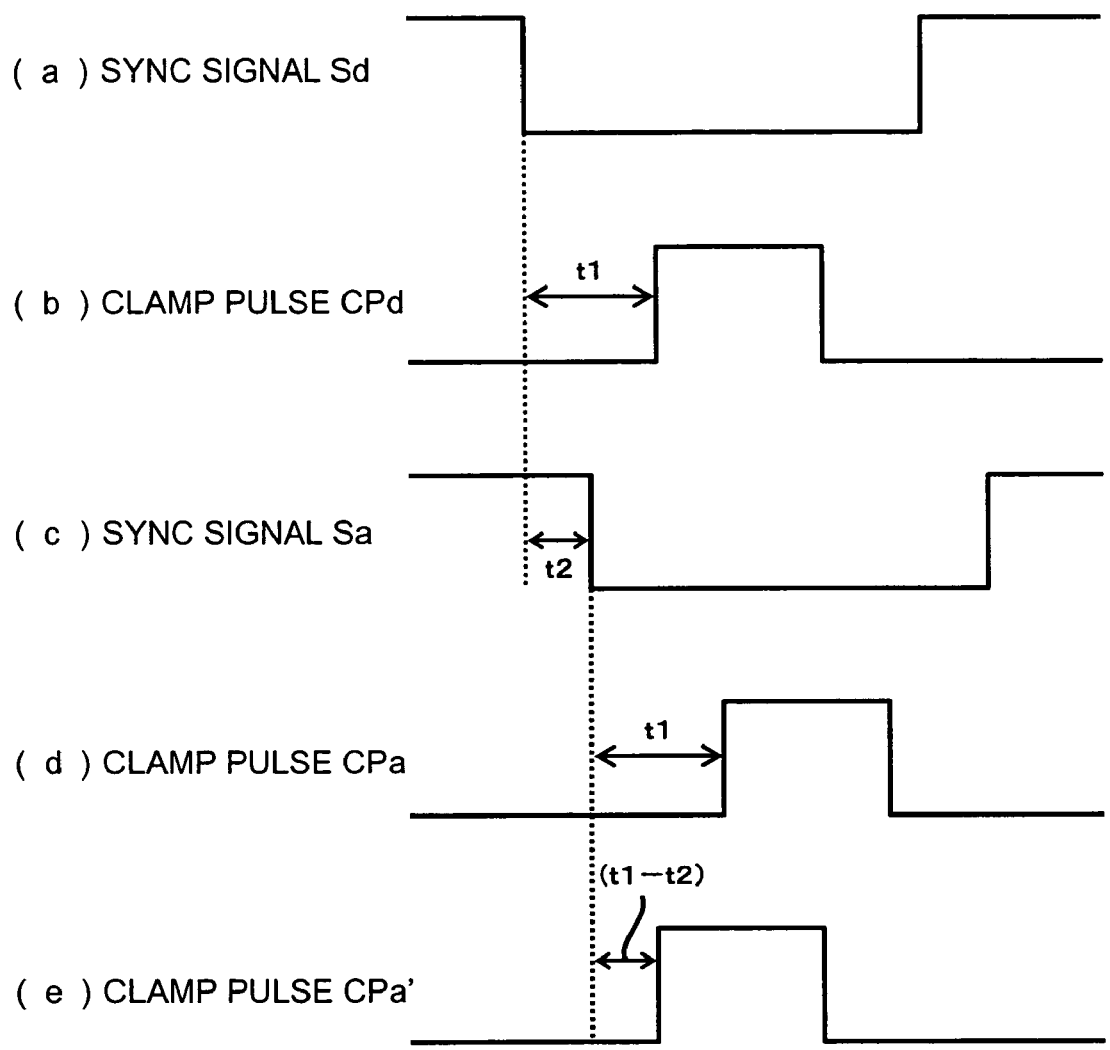
FIG. 9 is a diagram showing example waveforms of a sync signal and clamp pulse.

FIG. 9 is a diagram showing the waveforms of the sync signal and the clamp pulse. The sync signal Sd is shown in section (a) of FIG. 9, and a clamp pulse CPd generated on the basis of the sync signal Sd is shown in section (b) of FIG. 9. The clamp pulse generation circuit 113a generates the clamp pulse CPd after a lapse of a predetermined time period t1 from the fall of the sync signal Sd, as shown in these sections of FIG. 9. The time period t1 is determined in advance so that clamping can be suitably performed by using the clamp pulse CPd. The time period t1 is set in a register 113b.

The sync signal Sa is shown in section (c) of FIG. 9, and a clamp pulse CPa generated on the basis of the sync signal Sa is shown section (d) of FIG. 9. The sync signal Sa has a delay of a time period t2 from the sync signal Sd and the clamp pulse CPa correspondingly has a delay of time period t2 from the clamp pulse CPd as shown in these sections of FIG. 9. There is a possibility that suitable clamping will not be performed due to this clamp pulse delay. The user measures the time period t2 by which the sync signal Sa delays from the sync signal Sd, and changes the set value in the register 113b from t1 to (t1–t2). Then the clamp pulse generation circuit 113a generates a clamp pulse CPa' after a lapse of time (t1–t2) from the fall of the sync signal Sa, as shown in section (e) of FIG. 9. Thus, timing of the clamp pulse CPa' generated on the basis of the sync signal Sa can be performed in correspondence with the ideal timing of the clamp pulse CPd shown in section (b) of FIG. 9. The measurement of delay time t2 is made, for example, by observing the waveforms of the sync signals, the clamp pulses, or the output signal from the clamp circuit 150 with respect to the setting of "0" in the register 116 and the setting of "1" in the register 116, and by comparing the obtained waveforms.

The video signal processing circuit 2 according to the embodiment described above has advantages described below. That is, in the video signal processing circuit which performs AD conversion on an input analog composite video signal to obtain a digitized composite video signal, and which performs video signal processing on the digitized composite video signal, the input terminal 114 is provided to which a sync signal is supplied from an external analog sync separation circuit which removes high-frequency components from the analog composite video signal by means of an analog filter, and which separates the sync signal from the signal obtained by removing high-frequency components. Therefore the sync performance under a weak electric field condition can be improved.

In addition to the input terminal 114 to which the sync signal is supplied from the analog sync separation circuit, a digital sync separation circuit 112 and a selector 115 for selecting one of the sync signal supplied to the input terminal 114 and the sync signal obtained by the digital sync separation circuit 112 are also provided. Therefore, a user can select from a mode of use (A), in which the manufacturing cost is more heavily weighted and the digital sync separation circuit 112 performs sync separation while no analog sync separation circuit is provided, and a mode of use (B), in which greater importance is given to the sync performance and the analog sync separation circuit is provided and performs sync separation.

Because the input terminal 114, the digital sync separation circuit 112, and the selector 115 are provided, deviation with respect to time of the sync signal obtained by the analog sync separation circuit from the sync signal obtained by the digital sync separation circuit 112 can be checked by observing and comparing the waveforms of signals including the sync signals and the clamp pulse between the case where the sync signal obtained by the analog sync separation circuit is selected and the case where the sync signal obtained by the digital sync separation circuit 112 is selected. The analog sync separation circuit and the digital video signal processing circuit 113 are adjusted based on the check results to compensate for the deviation with respect to time of the sync signal obtained by the analog sync separation circuit.

The video signal processing circuit 3 according to this embodiment, i.e., the arrangement in which the analog sync separation circuit 120 is added to the video signal processing circuit 2, has advantages described below. That is, in the video signal processing circuit which makes AD conversion of an input analog composite video signal to obtain a digitized composite video signal, and which performs video signal processing on the digitized composite video signal, the analog sync separation circuit 120 is provided which removes high-frequency components from the analog composite video signal by means of an analog filter and separates a sync signal from the signal obtained by removing high-frequency components. Therefore, an accurate sync signal can be obtained by the analog sync separation circuit 120 to improve the sync performance under a weak-electric-field condition.

Figure 10:
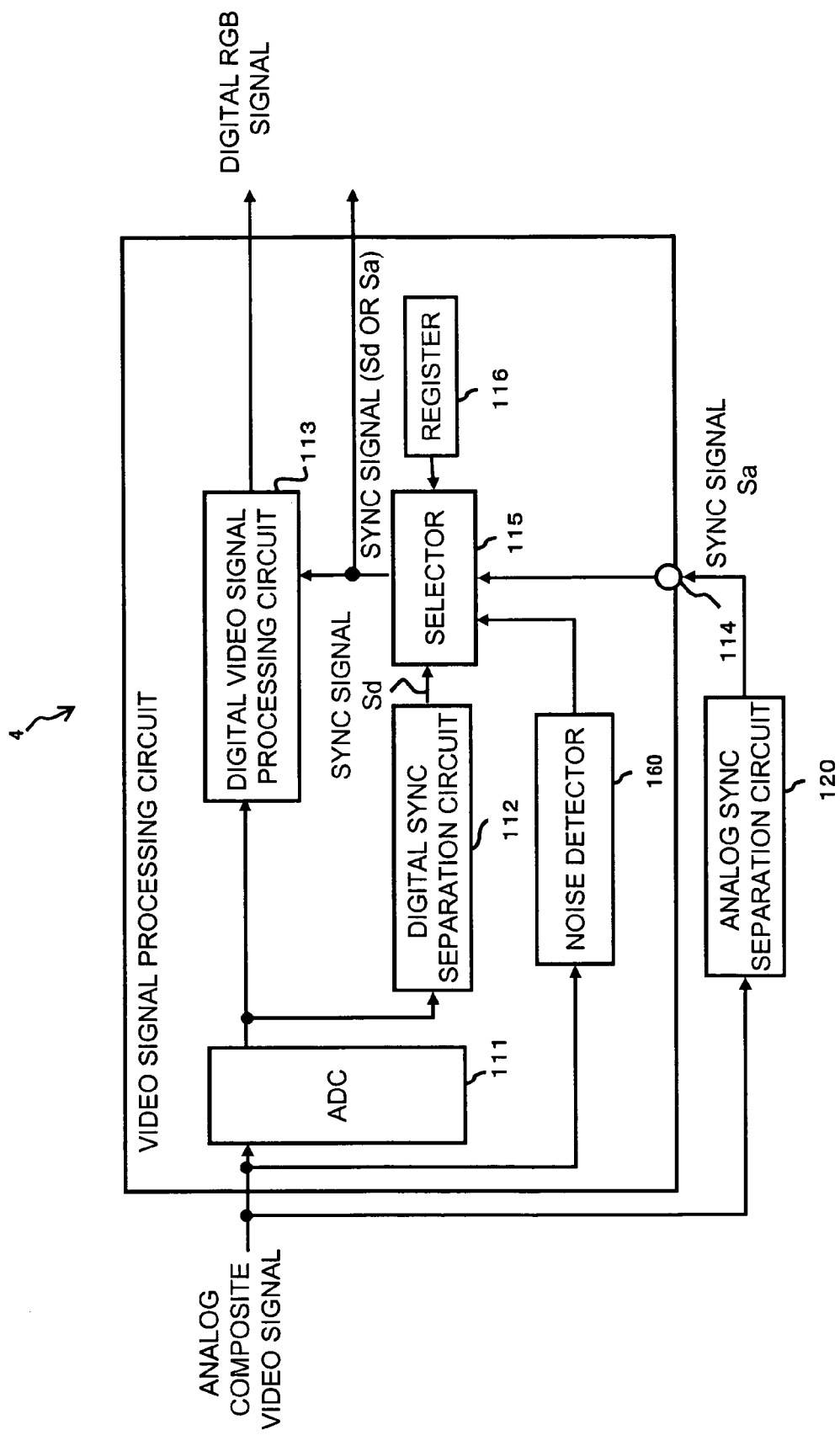
FIG. 10 is a block diagram showing the configuration of a video signal processing circuit having the function of selectively using the sync signals according to the amount of noise.
Figure 11:
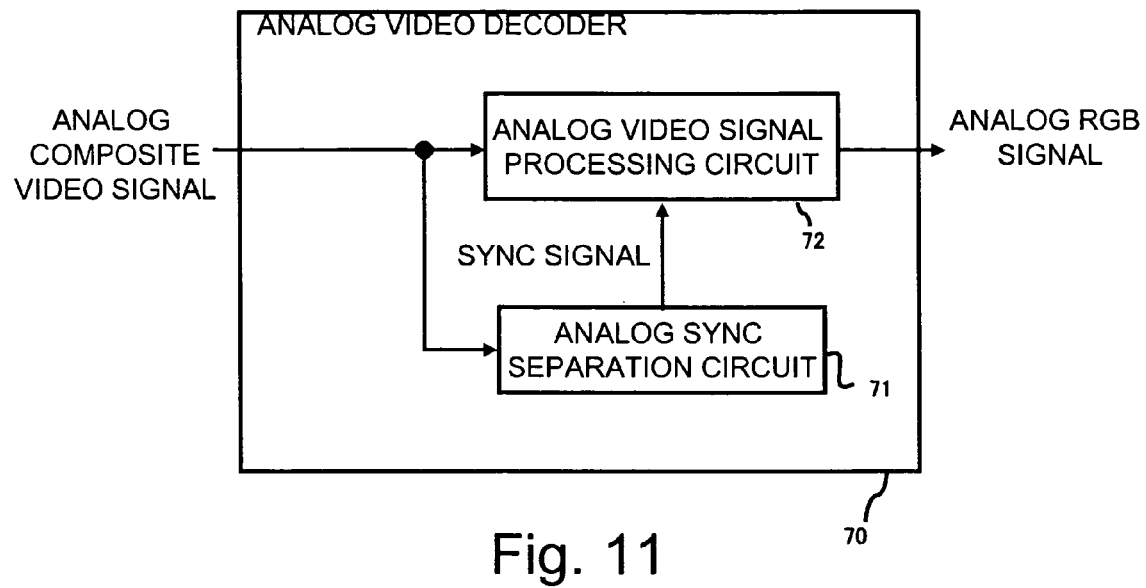
FIG. 11 is a block diagram showing the configuration of an analog video decoder.
Figure 12:
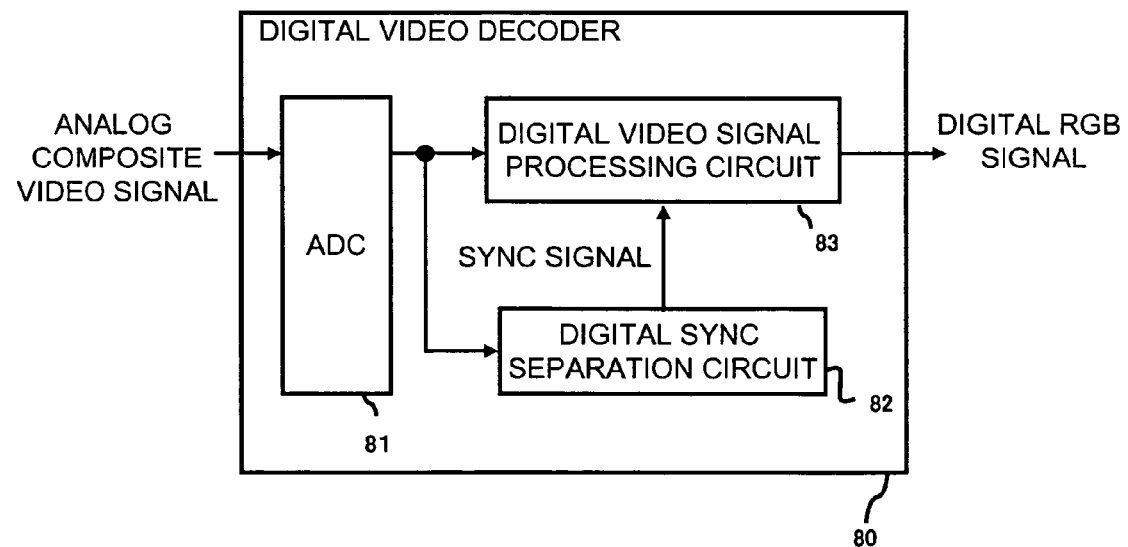
FIG. 12 is a block diagram showing the configuration of a digital video decoder.
Figure 13:
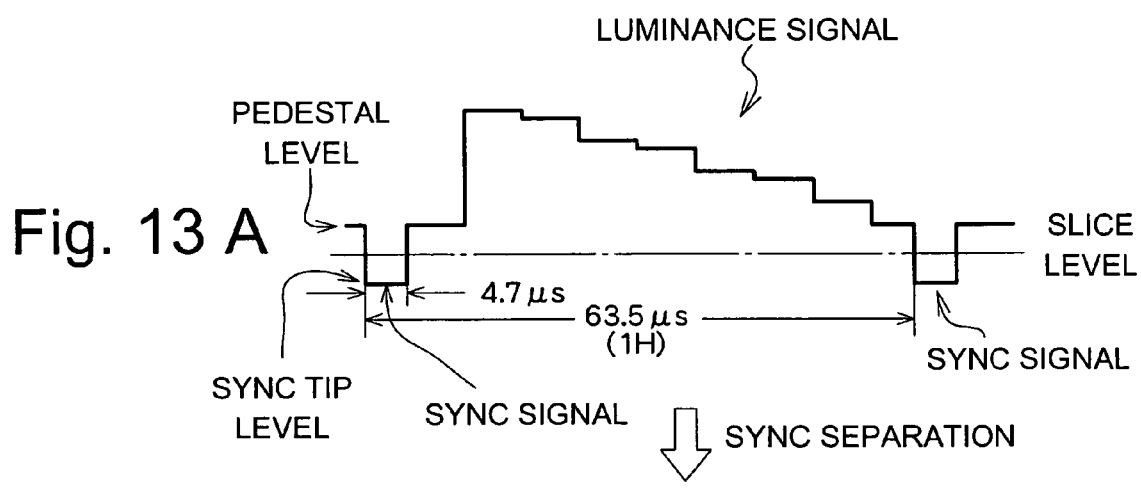
FIG. 13A is a diagram showing the waveform of an analog composite video signal free from noise.
FIG. 13B is a diagram showing the waveform of a sync signal separated by sync separation from the analog composite video signal.
FIG. 13C is a diagram showing the waveform of the analog composite video signal under a weak-electric-field condition.
Figure 13:
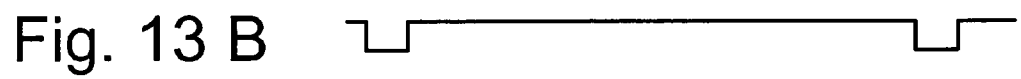
Figure 13:
Figure 14:
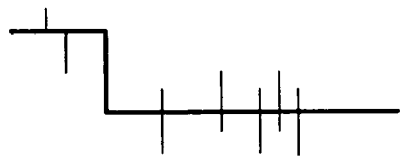
FIG. 14 is a diagram showing sync separation procedures.
Figure 14:
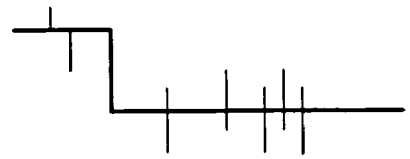
Figure 14:
Figure 14:
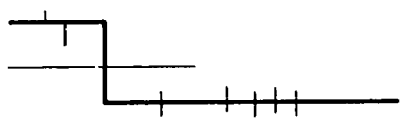
Figure 14:
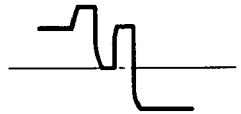
Figure 14:
Figure 14:

Also, because the analog sync separation circuit 120, the digital sync separation circuit 112, and the selector 115 are provided, the sync signal obtained by the analog sync separation circuit 120 and the sync signal obtained by the digital sync separation circuit 112 can be used selectively according to circumstances. For example, it is preferable to use the sync signal obtained by the digital sync separation circuit 112 with respect to a signal having a comparatively small amount of noise and to use the sync signal obtained by the analog sync separation circuit 120 with respect to a signal having a comparatively large amount of noise (a weak-electric-field signal or the like). FIG. 10 shows the configuration of a video signal processing circuit 4 having the function of selectively using the sync signals according to the amount of noise. Referring to FIG. 10, the video signal processing circuit 4 has a noise detector 160 for detecting the amount of noise contained in an analog composite video signal. The selector 115 selects one of the sync signals on the basis of the result of detection performed by the noise detector 160. More specifically, the selector 115 selects the sync signal obtained by the digital sync separation circuit 112 when the amount of noise detected by the noise detector 160 is lower than a predetermined level, and selects the sync signal obtained by the analog sync separation circuit 120 when the amount of noise is equal to or higher than the predetermined level.

The present invention is not limited to the above-described embodiments. Various changes and modifications can be made in the described embodiments without departing from the gist of the present invention. For example, in the first embodiment, the sync separation circuit 22 may supply C-SYNC as the sync signal to the digital video signal processing circuit 12. In such a case, there is no need for separation of H-SYNC and V-SYNC from C-SYNC in the sync separation circuit 22. Therefore, the components other than the comparator 31 in the circuit shown in FIG. 2 can be removed, while a need arises for the components for separating H-SYNC and V-SYNC from C-SYNC (e.g., the components 32 to 35 in FIG. 2) on the digital video signal processing circuit 12 side.

With the configuration of the second embodiment, the analog sync separation circuit 120 may supply C-SYNC as the sync signal to the video signal processing circuit 2. In such a case, it is not necessary to separate H-SYNC and V-SYNC from C-SYNC in the analog sync separation circuit 120. Therefore, the components other than the analog LPF 140 and the comparator 141 in the circuit shown in FIG. 7 can be removed, although it is necessary to supply the components for separating H-SYNC and V-SYNC from C-SYNC (e.g., the components 142 to 145 in FIG. 7) on the video signal processing circuit 2 side.

In the second embodiment, the operation of the digital sync separation circuit 112 may be suspended when the sync signal obtained by the analog sync separation circuit 120 is selected. Conversely, the operation of the analog sync separation circuit 120 may be suspended when the sync signal obtained by the digital sync separation circuit 112 is selected.

In the first and second embodiments, each of the digital video signal processing circuits 12 and 113 is preferably a circuit for generating a digital RGB signal. However, the digital video signal processing circuit is not limited to such a configuration, and maybe any other circuit for processing the digital composite video signal by using the sync signal. For example, the digital video signal processing circuits 12 and 113 may each be a circuit which generates and outputs a luminance signal and a color signal, a circuit which generates and outputs a luminance signal and a color-difference signal, or a circuit which generates and outputs a clamp pulse.

What is claimed is:

1. A video signal processing circuit which is supplied with an analog composite video signal formed by combining at least a luminance signal with a sync signal, and which processes the analog composite video signal, the video signal processing circuit comprising:
    an analog filter which removes high-frequency components from the analog composite video signal;
    a sync separation circuit which separates a sync signal from an output signal from the analog filter;

an AD converter which performs AD conversion on the analog composite video signal; and a digital video signal processing circuit which uses the sync signal obtained by the sync separation circuit to perform predetermined video signal processing on the composite video signal digitized by the AD converter.

2. A video signal processing circuit which is supplied with an analog composite video signal formed by combining at least a luminance signal with a sync signal, and which processes the analog composite video signal, the video signal processing circuit comprising:

an input terminal to which a sync signal separated from a signal obtained by removing high-frequency components from the analog composite video signal by means of an analog filter is supplied;

an AD converter which performs AD conversion on the analog composite video signal; and a digital video signal processing circuit which uses the sync signal supplied to the input terminal to perform predetermined video signal processing on the composite video signal digitized by the AD converter.

3. A video signal processing circuit which is supplied with an analog composite video signal formed by combining at least a luminance signal with a sync signal, and which processes the analog composite video signal, the video signal processing circuit comprising:

an AD converter which performs AD conversion on the analog composite video signal;

a digital sync separation circuit which separates a sync signal from the composite video signal digitized by the AD converter;

an input terminal to which a sync signal is externally supplied;

a selector which selects one of the sync signal obtained by the digital sync separation circuit and the sync signal supplied to the input terminal; and a digital video signal processing circuit which uses the sync signal selected by the selector to perform predetermined video signal processing on the composite video signal digitized by the AD converter.

4. The video signal processing circuit according to claim 3, wherein the input terminal is connected to an analog sync separation circuit which removes high-frequency components from the analog composite video signal by means of an analog filter, separates the sync signal from the signal obtained by removing high-frequency components from the analog composite video signal, and outputs the separated sync signal.

5. The video signal processing circuit according to claim 4, further comprising a noise detector which detects the amount of noise contained in the analog composite video signal, wherein the selector selects the sync signal in consideration of the result of a detection performed by the noise detector.

6. The video signal processing circuit according to claim 5, wherein the selector selects the sync signal obtained by the analog sync separation circuit when the amount of noise contained in the analog composite video signal is equal to or larger than a predetermined threshold value.

7. A video signal processing circuit which is supplied with an analog composite video signal formed by combining at least a luminance signal with a sync signal, and which processes the analog composite video signal, the video signal processing circuit comprising:

an AD converter which performs AD conversion on the analog composite video signal;

a digital sync separation circuit which separates a sync signal from the composite video signal digitized by the AD converter;

an analog sync separation circuit which removes high-frequency components from the analog composite video signal by means of an analog filter and separates a sync signal from the signal obtained by removing high-frequency components from the analog composite video signal;

a selector which selects one of the sync signal obtained by the digital sync separation circuit and the sync signal obtained by the analog sync separation circuit; and a digital video signal processing circuit which uses the sync signal selected by the selector to perform predetermined video signal processing on the composite video signal digitized by the AD converter.

8. The video signal processing circuit according to claim 7, further comprising a noise detector which detects the amount of noise contained in the analog composite video signal, wherein the selector selects the sync signal in consideration of the result of a detection performed by the noise detector.

9. The video signal processing circuit according to claim 8, wherein the selector selects the sync signal obtained by the analog sync separation circuit when the amount of noise contained in the analog composite video signal is equal to or larger than a predetermined threshold value.

* * * * *